United States Patent
Düll et al.

(10) Patent No.: US 11,269,297 B2
(45) Date of Patent: Mar. 8, 2022

(54) METHOD AND DEVICE FOR CONTROLLING A TECHNICAL SYSTEM BY MEANS OF CONTROL MODELS

(71) Applicant: SIEMENS AKTIENGESELLSCHAFT, Munich (DE)

(72) Inventors: Siegmund Düll, Munich (DE); Markus Michael Geipel, Munich (DE); Jean-Christoph Heyne, Nuremberg (DE); Volkmar Sterzing, Neubiberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 634 days.

(21) Appl. No.: 16/082,002

(22) PCT Filed: Feb. 1, 2017

(86) PCT No.: PCT/EP2017/052133
§ 371 (c)(1),
(2) Date: Sep. 4, 2018

(87) PCT Pub. No.: WO2017/153095
PCT Pub. Date: Sep. 14, 2017

(65) Prior Publication Data
US 2020/0301375 A1 Sep. 24, 2020

(30) Foreign Application Priority Data
Mar. 9, 2016 (DE) .................... 102016203855.9

(51) Int. Cl.
*G05B 13/02* (2006.01)
*G05B 13/04* (2006.01)
*G06F 21/60* (2013.01)

(52) U.S. Cl.
CPC ......... *G05B 13/029* (2013.01); *G05B 13/042* (2013.01); *G06F 21/602* (2013.01)

(58) Field of Classification Search
CPC .... G05B 13/029; G05B 13/042; G06F 21/602
(Continued)

(56) References Cited

U.S. PATENT DOCUMENTS

2002/0172184 A1* 11/2002 Kim .................. H04L 1/0041
370/344
2005/0246530 A1* 11/2005 Ushiku .................. G06F 21/51
713/168
(Continued)

FOREIGN PATENT DOCUMENTS

| CN | 104085265 A | 10/2014 |
|---|---|---|
| CN | 104142254 A | 11/2014 |

(Continued)

OTHER PUBLICATIONS

Office Action in Japanese Patent Application No. 2018-547436 dated Oct. 8, 2019. 10 pages.
(Continued)

*Primary Examiner* — Jigneshkumar C Patel
(74) *Attorney, Agent, or Firm* — Schmeiser, Olsen & Watts LLP

(57) ABSTRACT

In order to control a technical system by means of control model a data container is received, in which data container a control model having a training structure and model type information are encoded over all the model types. One of multiple model-type specific execution modules is selected for the technical system as a function of the model type information. Furthermore, operating data channels of the technical system are assigned input channels of the control model as a function of the model type information. Operating data of the technical system are acquired via a respec-
(Continued)

tive operating data channel and are transferred to the control model via an input channel assigned to this operating data channel. The control model is executed by means of the selected execution module, wherein control data are derived from the transferred operating data according to the training structure and are output to control the technical system.

14 Claims, 2 Drawing Sheets

(58) Field of Classification Search
USPC .......................................................... 700/47
See application file for complete search history.

(56) References Cited

U.S. PATENT DOCUMENTS

| | | |
|---|---|---|
| 2007/0142936 A1 | 6/2007 | Denison et al. |
| 2007/0265713 A1 | 11/2007 | Veillette et al. |
| 2008/0216050 A1* | 9/2008 | Behrendt ............... G06F 8/00 717/104 |
| 2009/0222110 A1 | 9/2009 | Lou |
| 2009/0319092 A1 | 12/2009 | Piche |
| 2010/0070098 A1 | 3/2010 | Sterzing et al. |
| 2014/0214733 A1 | 7/2014 | Alonso et al. |
| 2015/0195091 A1* | 7/2015 | Kubota ............... G06F 21/6227 713/191 |
| 2017/0115964 A1* | 4/2017 | Vadapandeshwara .... G06F 8/60 |

FOREIGN PATENT DOCUMENTS

| | | |
|---|---|---|
| CN | 104537435 A | 4/2015 |
| CN | 104573170 A | 4/2015 |
| CN | 104821764 A | 8/2015 |
| CN | 104836498 A | 8/2015 |
| DE | 19841165 A1 | 3/2000 |
| DE | 102007001024 A1 | 7/2008 |
| JP | 2000181526 A | 6/2000 |
| JP | 2011513861 A | 4/2011 |
| JP | 2015130144 A | 7/2015 |

OTHER PUBLICATIONS

Translation of the International Search Report for PCT Application No. PCT/EP2017/052133, dated May 11, 2017.
Notice of Allowance in related Japanese Patent Application No. 2018-547436, dated Mar. 3, 2020. 5 pages.
Office Action in Chinese Patent Application No. 201780015870.8 dated Nov. 2, 2020. 8 pages.
Decision to Grant in Korean Patent Application No. 10-2018-7029129 dated Nov. 24, 2020. 6 pages.

* cited by examiner

METHOD AND DEVICE FOR CONTROLLING A TECHNICAL SYSTEM BY MEANS OF CONTROL MODELS

CROSS-REFERENCE TO RELATED APPLICATIONS

This application claims priority to PCT Application No. PCT/EP2017/052133, having a filing date of Feb. 1, 2017 based off of German application No. DE102016203855.9, having a filing date of Mar. 9, 2016, the entire contents of both of which are hereby incorporated by reference.

FIELD OF TECHNOLOGY

In the control of complex technical systems, such as for example gas turbines, wind turbines or manufacturing installations, it is generally desirable to optimize the system behavior with regard to prescribed criteria. To this end, modern control systems often use machine learning techniques. A neural network may thus be trained as a control model, for example, to optimize a technical system with regard to a multiplicity of criteria.

BACKGROUND

Meanwhile, the control of relatively large installations in particular places high requirements in terms of safety and flexibility on the control systems that are used, which in many cases have to be subjected to an extensive certification process. However, this generally makes the use of learning-based control systems more difficult, as their internal response relationships are often difficult to comprehend externally and may change depending on a training state. A multiplicity of control models having different implementation requirements also exist. Accordingly, using learning-based control models, especially in the case of relatively large technical systems, often proves cumbersome.

SUMMARY

An aspect relates to specifying a method and a device for controlling a technical system, which method and device allow more flexible use of learning-based control models.

To control a technical system by means of a trained and/or trainable control model, a data container is received in which a control model having a training structure and model type information are encoded for all model types. The training structure may in this case in particular concern a structure that is trained, trainable, teachable and/or trained during training and/or a training state of the control model. Training is understood in this case in particular to mean that computation of input parameters of the control model is optimized during a training phase with respect to one or more target variables depending on prescribable criteria. Such training may be performed for example by training a neural network, by regression of an analytical or statistical model and/or by another type of parameter fitting. According to embodiments of the invention, one of a plurality of model type-specific execution modules is selected for the technical system depending on the model type information. Furthermore, operating data channels of the technical system are assigned to input channels of the control model depending on the model type information. Operating data of the technical system are acquired via a respective operating data channel and are transmitted to the control model via an input channel assigned to this operating data channel. The control model is executed by way of the selected execution module, wherein control data, which are output in order to control the technical system, are derived from the transmitted operating data according to the training structure. Forecast data and/or monitoring data relevant to control may also be output as control data.

In order to perform the method according to embodiments of the invention, a control device, a computer program product (non-transitory computer readable storage medium having instructions, which when executed by a processor, perform actions) and a computer-readable storage medium are provided.

One advantage of embodiments of the invention is observed in that, by way of the model type-specific execution modules, control structures of the technical system are largely able to be decoupled from specific requirements of different control model types. This allows easier and more flexible implementation of completely different control models. In particular, different control models are able to be executed automatically on the same technical system, and the same control model is able to be executed automatically on different technical systems. By way of the model type-specific assignment of operating data channels to input channels, the control model is able to be driven appropriately with operating data.

The control model may preferably comprise a neural network, a data-driven regressor, a support vector machine and/or a decision tree. The above implementations may in each case be provided with a training structure and identified by specific model type information.

According to one advantageous embodiment of the invention, the control model may be present in the data container in encrypted form and be at least partly decrypted by the technical system. The control model may thus be protected against unauthorized access during transmission and storage.

Preferably, the control model may be encoded and/or encrypted in such a way that derivation of a model structure of the control model on the basis of parts of the control model, which parts are decoded and/or decrypted in order to execute the control model, is prevented or made difficult. The model structure may concern for example the training structure and/or a specific layer, node, network or weighting structure of a neural network. The control model may in this case be encrypted such that only parts of the control model that are relevant to execution are able to be decrypted by the technical system, but a specific model structure remains largely concealed. Thus, in the case of a neural network, only one executable calculation routine may be encoded, from which a specific network structure is able to be derived only with difficulty. The control model may thus be executed as a black box, as it were. By way of such encoding or encryption, know-how contained in the model structure is able to be protected.

Furthermore, the control model in the data container may be provided with a digital signature that is checked by the technical system, for example. The control model may then be executed depending on the result of the check. Integrity of the control model is thus able to be ensured. In particular, creation of, training of and/or changes to the control model are able to be attributed unambiguously to a responsible authority.

Furthermore, the data container may comprise training information regarding training of the control model. The execution of the control model and/or the selection of the execution module may then take place depending on the training information. The training information may in particular concern a previous or upcoming training process for the control model.

According to one advantageous embodiment of the invention, the operating data channels and the input channels may each be assigned a data type, a physical dimension, a range of values and/or an additional condition. In the assignment of a respective operating data channel to a respective input channel, it may be checked whether the assigned data types, physical dimensions, ranges of values and/or additional conditions are compatible. By way of example, meters, seconds, grams or combinations thereof may be assigned as physical dimensions. In many cases, it is thus able to be ensured that the control model is driven with correct operating data. As an alternative or in addition, the acquired operating data may be checked with regard to data type, physical dimension, range of values and/or additional conditions, in order thus to ensure correct driving of the control model during the execution.

Furthermore, the control data may be checked with regard to their range of values, a change in value and/or an additional condition. Since, in the case of trained control models, the dependencies of the output data on input data are not generally explicitly known, and it is often not possible to rule out model errors, incorrect control is often able to be avoided by checking prescribed additional conditions.

According to one advantageous development of embodiments of the invention, a plurality of runtime environment-specific adapters may each be assigned to a runtime environment. The adapters in this case serve to adapt execution modules to the assigned runtime environment. Furthermore, environment information regarding a runtime environment of the technical system may be acquired and, depending on the acquired environment information, an adapter assigned to the runtime environment of the technical system may be selected. The selected execution module may then be coupled to the runtime environment via the selected adapter. Execution modules and control models may thus be created and implemented largely independently of the respective runtime environment. Accordingly, adapters may be developed and implemented largely independently of the type of the control model. Control models and runtime environment may thus be decoupled, as it were, as a result of which a development and/or implementation process is often simplified considerably.

Furthermore, the selected adapter may provide capability information regarding capabilities of the runtime environment of the technical system. Depending on the capability information, compatibility of the control model with the runtime environment may be checked and the control model may be executed depending thereon. Automatic implementation of the control model is thus able to be simplified.

BRIEF DESCRIPTION

Some of the embodiments will be described in detail, with reference to the following figures, wherein like designations denote like members, wherein.

DETAILED DESCRIPTION

Figure 1:
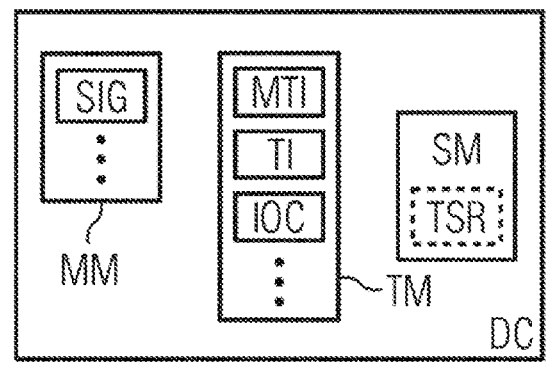
FIG. 1 shows a data container having an encoded control model.

FIG. 1 schematically illustrates a data container DC according to embodiments of the invention having an encoded, trained and/or trainable control model SM. The control model SM serves to simulate a physical, regulation-based and/or stochastic dynamic system or another interdependency of a technical system or of part thereof. The control model SM may comprise a neural network, a data-driven regressor, a support vector machine, a decision tree and/or another analytical model or a combination thereof. The control model SM is encoded in the data container DC for all model types, for example in what is called PMML-format (PMML: Predictive Model Markup Language) or in a proprietary format.

In the present exemplary embodiment, the control model SM is additionally encrypted for data security purposes during transmission and storage. Furthermore, the control model SM has a training structure TSR. The training structure TSR comprises a teachable structure, preferably in a pre-trained training state. In the case of a neural network, the training structure TSR may for example comprise a network structure of neurons and weighting of connections between neurons. In the case of data-driven regressors, the training structure TSR may contain coefficients of the regressor model. The training structure TSR may relate both to previous and to future training of the control model SM.

The data container DC furthermore contains technical metadata TM and model metadata MM.

The technical metadata TM comprise, in the present exemplary embodiment, model type information MTI, training information TI and input/output contract data IOC. Furthermore, the technical metadata TM contain context information, such as for example a creation time of the control model SM, information regarding intended target systems and/or information regarding requirements of the control model SM in terms of a runtime environment, for example with regard to real-time capabilities, parallelizability, computing resources and/or compatibility with different execution modules.

The model type information MTI is encoded for all model types and specifies a type of the control model SM. In this case, it may be specified for example whether the control model SM is based on a neural network, on a data-driven regressor, on a support vector machine, on a decision tree and/or on a combination thereof. Furthermore, input variables and/or output variables of the control model SM and other specific requirements, capabilities and/or properties of the control model SM may be specified.

The training information TI describes a previous and/or upcoming training process and/or a training state of the control model SM.

The input/output contract data IOC specify what is called an input/output contract, which sets additional conditions in terms of a behavior of the control model SM. By way of the input/output contract data IOC, prescribed additional conditions, such as for example ranges of values, changes in values, a rate of changes in values and/or data types of input data and/or output data of the control model SM may preferably be specified in a format for all model types. The input/output contract data IOC may advantageously be specified in a user-readable format in order thus to ensure, in a manner able to be checked, a desired behavior of the control model SM whose training structure TSR is not generally user-readable.

The model metadata MINI contain, in the present exemplary embodiment, one or more digital signatures SIG, for example of individuals and/or authorities that have created, trained and/or changed the control model SM.

Furthermore, the model metadata MINI may comprise version information, rights information, and information regarding a source and/or regarding a target system of the control model SM. Furthermore, specifications regarding a period of validity, regarding required data processing resources and/or regarding admissible or possible areas of use, for example for monitoring, for forecasting and/or for control, may be contained in the model metadata MM.

Figure 2:
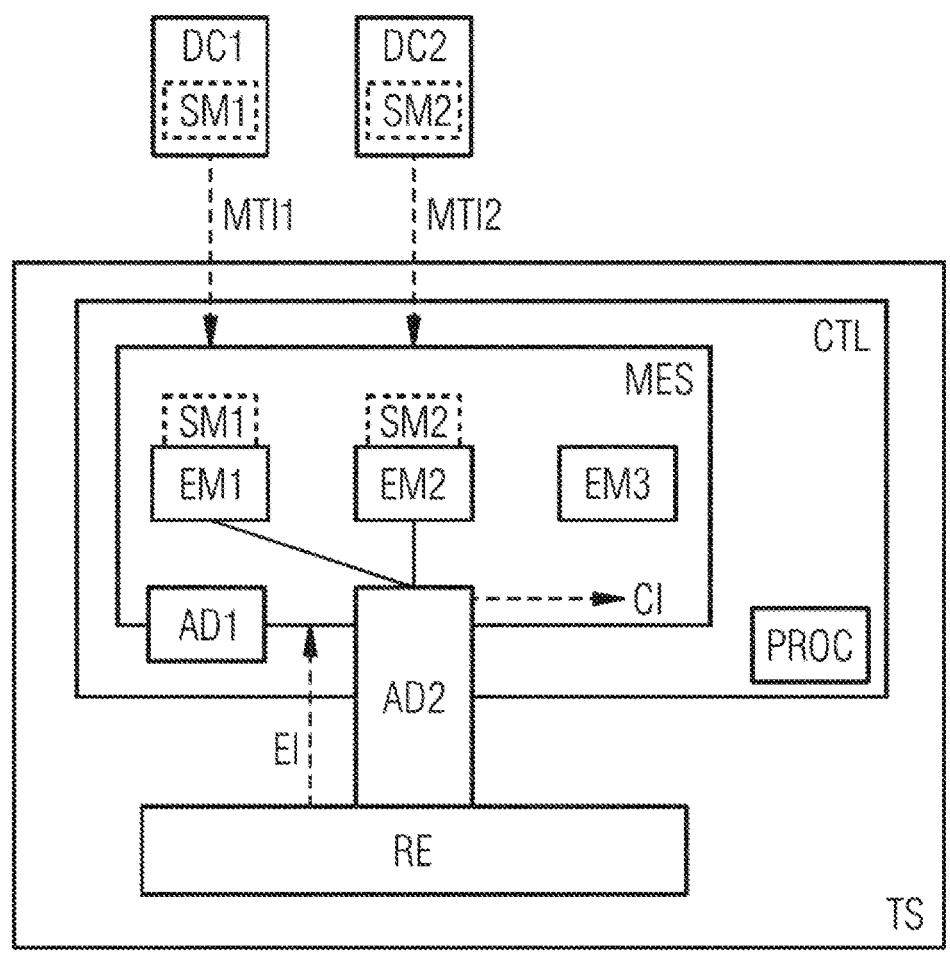
FIG. 2 shows a technical system having a control device.

FIG. 2 shows a schematic illustration of a technical system TS having a control device CTL according to embodiments of the invention for the technical system TS. The technical system TS may be for example a power plant, a production installation, a gas turbine, etc.

The technical system TS has a runtime environment RE for data processing purposes and for controlling the technical system TS. Such a runtime environment, RE here, may comprise a combination of operating system, cloud/cluster middleware and/or data processing environment. Examples of these are a Linux cluster with Hadoop/HIVE framework, a cluster stream processing environment or a multicore stream processing environment.

The control device CTL, for example a control system for a gas turbine, contains one or more processors PROC for executing all of the method steps of the control device CTL, and a model execution system MES. The latter is implemented in the control device CTL in the present exemplary embodiment, but may, as an alternative or in addition, be implemented at least partly externally, for example in a cloud. The model execution system IVIES may be used as an abstraction layer between control models and the runtime environment RE. The model execution system MES comprises a plurality of execution modules EM1, EM2 and EM3, and a plurality of adapters AD1 and AD2.

The execution modules EM1, EM2 and EM3 serve to execute, install, initialize and/or evaluate trained and/or trainable control models on the or for the technical system. The execution modules EM1, EM2 and EM3 are in each case specific to a control model type. Such execution modules are often also referred to as interpreters.

The adapters AD1 and AD2 serve to adapt execution modules, here EM1, EM2 and EM3, to different runtime environments. The adapters AD1 and AD2 are in each case specific to a runtime environment.

To select a runtime environment-specific adapter, the model execution system MES acquires environment information EI that describes the runtime environment RE from the runtime environment RE present in the technical system TS. Depending on the acquired environment information EI, the model execution system IVIES selects one of the adapters AD1, AD2, which is specific to and suitable for the runtime environment, here RE, described by the environment information EI. In the present exemplary embodiment, the adapter AD2 proves to be suitable for the present runtime environment RE and is therefore selected and coupled to the runtime environment RE.

The selected adapter AD2 then provides capability information CI regarding specific capabilities of the runtime environment RE, on the basis of which information compatibility of control models with the runtime environment RE is able to be checked by the model execution system MES.

To control the technical system TS, the model execution system IVIES receives various data containers DC1 and DC2, which are each configured as described in FIG. 1. The data containers DC1 and DC2 each contain a specific control model SM1 and SM2, respectively. The data containers DC1 and DC2 are preferably transmitted to the technical system TS as specific messages.

The control models SM1 and SM2 are each configured as described in connection with FIG. 1, and serve to simulate various physical, regulation-based, stochastic and/or other interdependencies of the technical system TS or of part thereof. The control models SM1 and SM2 are in each case preferably specific to particular parts of the technical system, particular regulation tasks, particular control tasks and/or particular simulation types. The control models SM1 and SM2 are in each case encoded for all model types.

By way of the data containers DC1 and DC2, in each case model type information MTI1 and MTI2, respectively, for the control model SM1 and SM2, respectively, is transmitted to the model execution system MES. MTI1 and MTI2 each specify a model type of the control model SM1 and SM2, respectively, and may in each case be configured as described in connection with FIG. 1.

Following reception of the data containers DC1 and DC2, the model execution system IVIES unpacks these data containers and checks each of their digital signatures. If the result of the check is negative, further processing of the control model SM1 or SM2 in question is suppressed. Furthermore, the model execution system IVIES checks, for a respective control model SM1 or SM2, on the basis of their technical metadata and on the basis of the capability information CI, whether and to what extent the respective control model SM1 or SM2 is compatible with the runtime environment RE. Depending on this, further processing of the respective control model SM1 or SM2 takes place.

Furthermore, the model execution system IVIES decrypts the encrypted control models SM1 and SM2. In this case, preferably only parts of the respective control model that are relevant to execution are decrypted, so that the control model is able to be executed, but a model structure of the control model is not able to be derived with reasonable effort.

Furthermore, the model execution system IVIES selects, for each control model SM1 and SM2, an execution module that is in each case specific thereto on the basis of the model type information MTI1 and MTI2, respectively, and possibly on the basis of other technical metadata. In the present exemplary embodiment, the execution module EM1 is selected and assigned for the control model SM1, and the execution module EM2 is selected and assigned for the control model SM2. The model execution system IVIES then couples the selected execution modules EM1 and EM2 to the runtime environment RE by way of the selective adapter AD2.

To process operating data of the technical system TS, the model execution system IVIES executes the control models SM1 and/or SM2 on the runtime environment RE, wherein the model execution system MES delegates the execution of a respective control model SM1 or SM2 to the respectively assigned execution module EM1 or EM2. During the execution of a respective control model SM1 or SM2, by means of the input/output contract data of the respective control model SM1 or SM2, compliance with the input/output contract specified thereby is monitored and ensured.

Figure 3:
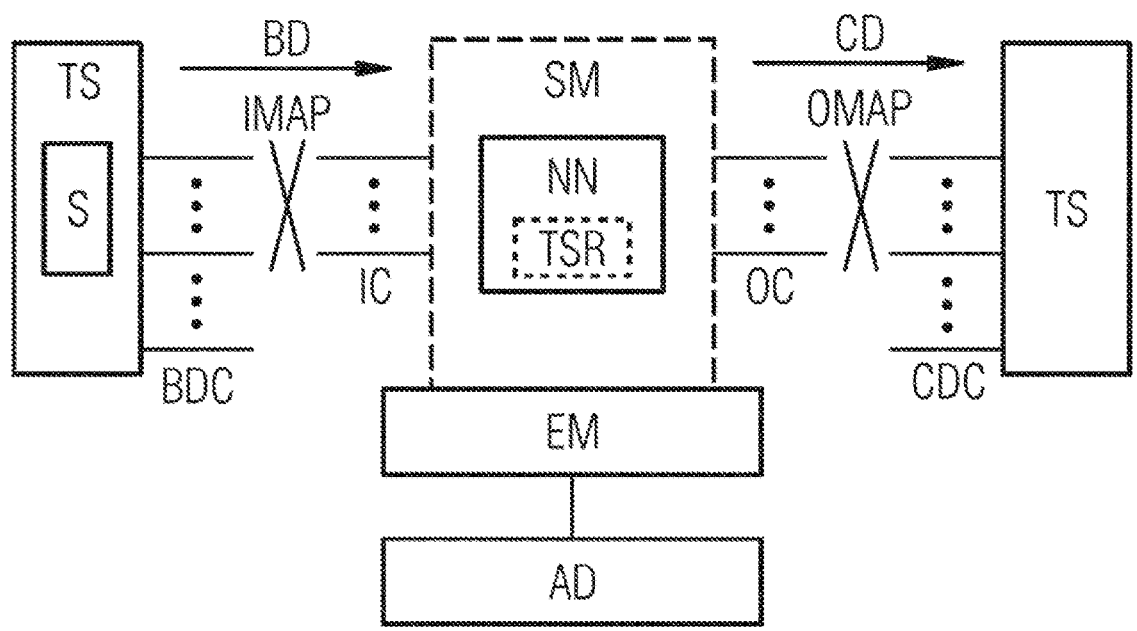
FIG. 3 shows an illustration of derivation of control data from operating data by way of a control model.

FIG. 3 illustrates derivation of control data CD from operating data BD of the technical system TS by way of a control model SM that is executed by an execution module EM on the technical system TS by way of a coupled adapter AD. For the sake of clarity, the same technical system TS is illustrated schematically on both sides of FIG. 3. The technical system TS, the control model SM, the execution module EM and the adapter AD are preferably configured as described in connection with FIGS. 1 and 2.

The control model SM is implemented by way of a neural network NN that has a training structure TSR.

The technical system TS has sensors S for acquiring the operating data BD of the technical system TS. The operating data BD may be for example physical, regulation-based and/or design-related operating variables, properties, prescribed values, state data, system data, control data, sensor data and/or measured values of the technical system TS. In particular, the operating data BD may also comprise data not originating from the sensors S.

The operating data BD are acquired via specific operating data channels BDC of the technical system TS. The operating data channels BDC may in this case be specific to a data type, to a physical dimension, to a source, to a function and/or to other properties of the operating data BD.

The control model SM has various input channels IC, which are assigned to various input parameters or input data of the control model SM. The input channels IC may be specific to a parameter type, to a physical dimension, to a source, to a function and/or to other properties of the input parameters or input data.

An assignment IMAP takes place between the input channels IC and the operating data channels BDC, in which assignment in each case one of the operating data channels BDC is assigned to a respective input channel IC on the basis of the model type information MTI and possibly on the basis of the input/output contract data IOC. The assignment IMAP is carried out by the model execution system MES, preferably by way of the selected execution module EM.

On the basis of the data types, physical dimensions, ranges of values and/or additional conditions each respectively assigned to the operating data channels BDC and input channels IC, the model execution system MES checks whether the assigned data types, physical dimensions, ranges of values and additional conditions of the input channels IC are compatible with those of the assigned operating data channels BDC. If this is not the case, execution of the control model SM is suppressed.

The operating data BD acquired via the operating data channels BDC are supplied to the control model SM as input data via the assigned input channels IC. The model execution system IVIES executes the control model SM by way of the selected execution module EM, wherein control data CD are derived from the transmitted operating data BD according to the training structure TSR. The control data CD are output as output data of the control model SM. The control data CD serve in this case to control the technical system TS and may in particular also be forecast data and monitoring data relevant to control.

The control data CD are output via specific output channels OC of the control model SM that are assigned to various output parameters of the control model SM. The output channels OC may in each case be specific to a parameter type, a use, a purpose and/or a control function of the control data CD output thereby.

The model execution system IVIES executes an assignment OMAP of a respective output channel OC to one of a plurality of control channels CDC of the technical system, preferably by way of the selected execution module EM. The assignment in this case takes place depending on the model type information MTI and possibly depending on the input/output contract data IOC. In the assignment OMAP, it is checked whether the assigned data types, physical dimensions, ranges of values etc. of the control channels CDC and of the output channels OC are compatible with one another. If not, the execution of the control model SM is suppressed.

During the execution of the control model SM, on the basis of the input/output contract data IOC, compliance with the relevant input/output contract is monitored and ensured by the model execution system MES.

Figure 4:
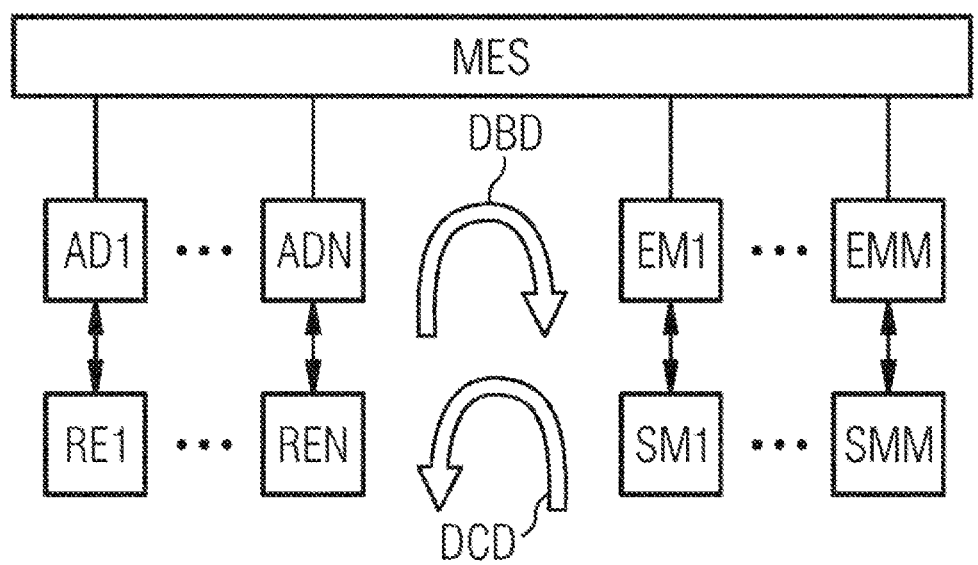
FIG. 4 shows an illustration of an interaction of control models with runtime environments.

FIG. 4 illustrates interaction of various control models SM1, . . . , SMM with various runtime environments RE1, . . . , REN.

The runtime environments RE1, . . . , REN are in each case coupled as described above to a model execution system MES via one of a plurality of runtime environment-specific adapters AD1, . . . , ADN, respectively. Furthermore, the control models SM1, . . . , SMM are in each case coupled as described above to the model execution system IVIES via one of a plurality of model type-specific execution modules EM1, . . . , EMM, respectively.

Arrival of operating data in one of the runtime environments RE1, . . . , REN, respectively, or acquisition of these operating data by one of these runtime environments initiates data-driven processing of the operating data through delegation DBD of the processing of the acquired runtime environment RE1, . . . , REN, respectively, via a runtime environment-specific adapter AD1, . . . , ADN, respectively, and a model type-specific execution module EM1, . . . , EMM, respectively, to the specific control model SM1, . . . , SMM, respectively. The delegation DBD is in this case performed by the model execution system MES.

Outputting of the control data derived by a respective control model SM1, . . . , SMM, respectively, initiates delegation DCD, performed by the model execution system MES, of the control process of the technical system. The delegation DCD takes place from a respective control model SM1, . . . , SMM, respectively, via the respective assigned model type-specific execution module EM1, . . . , EMM, respectively, and the respective runtime environment-specific adapter AD1, . . . , ADN, respectively, to the assigned runtime environment RE1, . . . , REN, respectively, which controls the technical system TS by means of the control data CD.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for controlling a technical system by means of a trained and/or trainable control model, the method comprising:
  receiving, by a processor, a data container in which a control model having a training structure and model type information are encoded for all model types, wherein the model type information specifies a type of model of the control model;
  a) selecting, by the processor, one of a plurality of model type-specific execution modules for the technical system depending on the model type information;
  b) assigning, by the processor, operating data channels of the technical system to input channels of the control model depending on the model type information;
  c) acquiring, by the processor, operating data of the technical system via a respective operating data channel and transmitting the operating data to the control model via an input channel assigned to the operating data channel;

d) executing, by the processor, the control model by way of the selected execution module, wherein control data are derived from the transmitted operating data according to the training structure of the control model; and e) outputting, by the processor, the control data to control the technical system via output channels of the control model that are assigned based on the model type information of the control model.

2. The method as claimed in claim 1, wherein the control model comprises a neural network, a data-driven regressor, a support vector machine and/or a decision tree.

3. The method as claimed in claim 1, wherein the control model is present in the data container in encrypted form and is at least partly decrypted by the technical system.

4. The method as claimed in claim 1, wherein the control model is encoded and/or encrypted in such a way that derivation of a model structure of the control model on the basis of parts of the control model, which parts are decoded and/or decrypted in order to execute the control model, is prevented or made difficult.

5. The method as claimed in claim 1, wherein the control model in the data container is provided with a digital signature, the digital signature is checked, and the control model is executed depending on the result of the check.

6. The method as claimed in claim 1, wherein the data container comprises training information regarding training of the control model, and in that the execution of the control model and/or the selection of the execution module takes place depending on the training information.

7. The method as claimed in claim 1, wherein the operating data channels and the input channels are each assigned a data type, a physical dimension, a range of values and/or an additional condition, and, in the assignment of a respective operating data channel to a respective input channel, it is checked whether the assigned data types, physical dimensions, ranges of values and/or additional conditions are compatible.

8. The method as claimed in claim 1, wherein the control data are checked with regard to their range of values, a change in value and/or an additional condition.

9. The method as claimed in claim 1, wherein a plurality of runtime environment-specific adapters are each assigned to a runtime environment in order to adapt execution modules to the assigned runtime environment, in that environment information regarding a runtime environment of the technical system is acquired, in that, depending on the acquired environment information, an adapter assigned to the runtime environment of the technical system is selected, and in that the selected execution module is coupled to the runtime environment via the selected adapter.

10. The method as claimed in claim 9, wherein the selected adapter provides capability information regarding capabilities of the runtime environment of the technical system, and depending on the capability information, compatibility of the control model with the runtime environment is checked and the control model is executed depending thereon.

11. The method as claimed in claim 1, wherein the control model is regularly retrained or continuously trained by means of the transmitted operating data.

12. A device for controlling a technical system by means of a trained and/or trainable control model, configured to execute a method as claimed in claim 1.

13. A computer program product, comprising a non-transitory computer readable hardware storage device having computer readable program code stored therein, said program code executable by a processor of a computer system to implement the method as claimed in claim 1.

14. A non-transitory computer-readable storage medium having the computer program product as claimed in claim 13.

* * * * *